United States Patent [19]

Mann

[11] 4,175,274

[45] Nov. 20, 1979

[54] RECORDING SYSTEM WITH FLEXIBLE MAGNETIC RECORDING DISC

[75] Inventor: Don C. Mann, Richardson, Tex.

[73] Assignee: Texas Instruments Incorporated, Dallas, Tex.

[21] Appl. No.: 848,182

[22] Filed: Nov. 3, 1977

[51] Int. Cl.[2] .................. G11B 17/04; G11B 23/02
[52] U.S. Cl. .................. 360/99; 360/130.1; 360/133
[58] Field of Search .................. 360/97–99, 360/133, 135, 86, 130; 206/444

[56] References Cited

U.S. PATENT DOCUMENTS

| 2,950,353 | 8/1960 | Fomenko | 360/99 X |
| 3,529,301 | 9/1970 | Hiruta | 360/97 |
| 3,947,893 | 3/1976 | Hall | 360/99 |

FOREIGN PATENT DOCUMENTS 2659574  7/1977  Fed. Rep. of Germany ............ 360/133

OTHER PUBLICATIONS

IBM Technical Disclosure Bulletin, vol. 16, No. 11, Apr. 1974, p. 3805, "Gamma Fe₂O₃ Films" by Ahn et al.
IBM Technical Disclosure Bulletin, vol. 19, No. 7, Dec. 1976, pp. 2684, 2685, "Cartridge for Magnetic Disc" by Kery et al.
IBM Technical Disclosure Bulletin, vol. 19, No. 12, May 1976, pp. 4720, 4721, "Encased Flexible Magnetic Disc with Wiper" by Bother.

Primary Examiner—John H. Wolff
Attorney, Agent, or Firm—William K. McCord; James T. Comfort; Melvin Sharp

[57] ABSTRACT

A flexible disc is provided for the recording and playback of information on a recording surface thereof. The disc is contained within a cartridge housing which protects the recording surface. At least one opening is provided in the disc which engages with at least one pin member of a drive hub, the drive hub providing rotation to the disc. The outer perimeter of the opening in the disc is larger than the outer perimeter of the pin member so that the disc is free to move laterally along the pin. At least one surface of the cartridge housing acts as a smoothing plane; rotation of the disc causes the disc to rise above such surface creating an air cushion between the disc and surface. An opening is provided in the cartridge housing for receiving a recording and/or playback head; the head is moveable within such opening so that it may be selectively indexed to read and/or write information on a plurality of tracks as the disc rotates within the cartridge. A relatively thin flexible spring member is fixed to the opposite side of the cartridge housing for applying a bias against the rotating disc directly opposite the opening to provide adequate head-to-disc coupling pressure over a wide range of vertical head alignments and geometries. In one embodiment, the flexible spring member is comprised of a mylar material.

12 Claims, 8 Drawing Figures

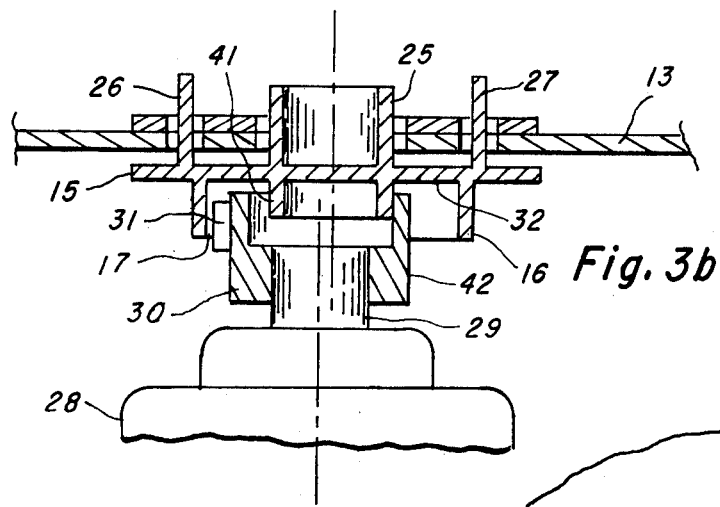
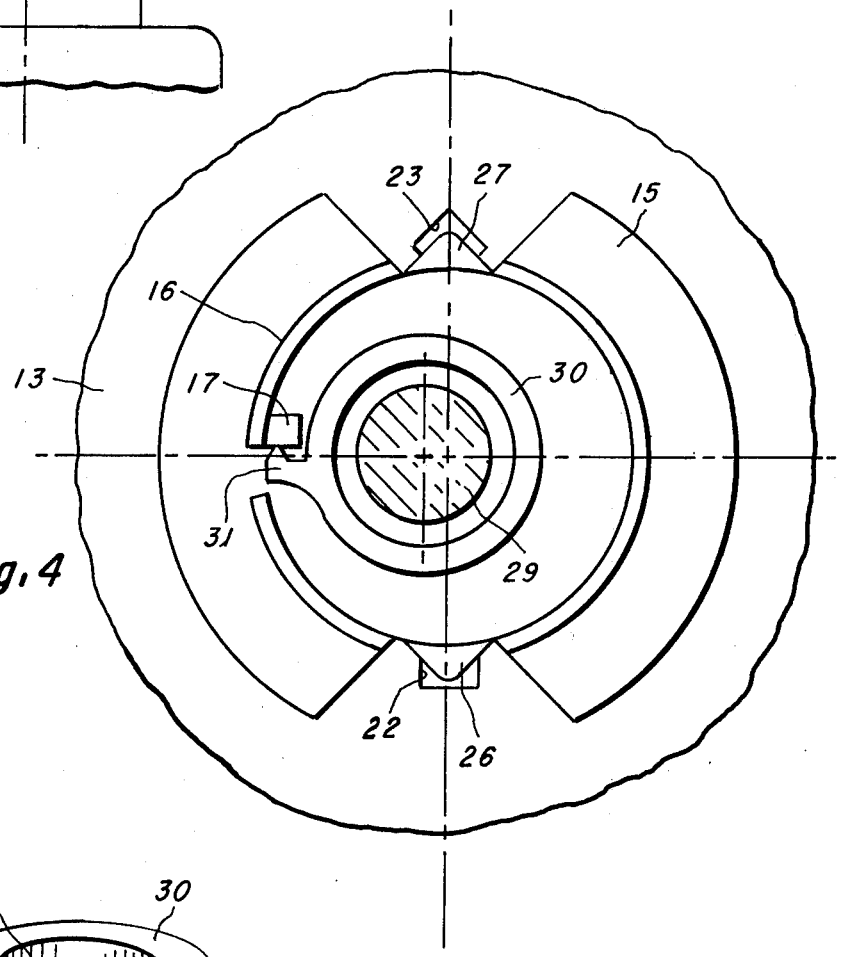
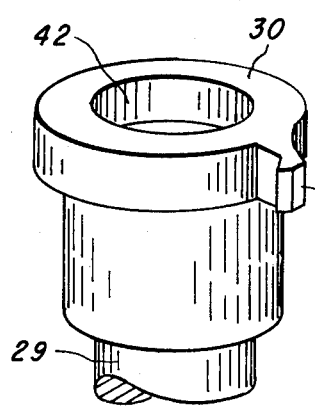

RECORDING SYSTEM WITH FLEXIBLE MAGNETIC RECORDING DISC

BACKGROUND OF THE INVENTION

This invention relates to flexible storage media cartridges, and more particularly, to such cartridges which includes a bias member comprised of a relatively thin sheet of flexible material mounted opposite the record/read head receiving portion of the media.

This invention further relates to copending U.S. patent applications Ser. Nos. 848,181, 848,183, and 848,184, each filed of even date with and assigned to the assignee of the present invention. Copending application serial No. 848,181, now abandoned, describes a cartridge containing a flexible information storage media. A cylindrical chamber is provided therein to retain the storage media and a cavity in the cylindrical wall of the chamber provides back pressure on the media to stabilize contact with a recording and/or playback head for recording or reading information onto the media. Copending application Ser. No. 848,183 teaches a cartridge containing a flexible information storage media connected to a drive member having a central recessed portion for accommodating a rotational means and a latch member extending radially from the recessed portion which engages a latch member on the rotational means. Copending application serial No. 848,184, now abandoned, describes a cartridge containing a flexible information storage media which is coupled to a drive member by means of at least one pin member of the drive member extending through at least one opening in the storage media. The storage media is free to move laterally with respect to the drive member.

In recording or reading information on a moving information storage media, such as magnetic recording, relative motion between the record/read head and the recording media is required. The relative velocity between the head and media interface may be, for example, 550 IPS for video and high density digital applications. To achieve maximum performance, there must be an interface of intimate contact between the record/read head and the media surface without destruction or excessive wear of the magnetic flux responsive coating on the surface.

As contact pressure between the head and media is increased to improve performance, both media and head wear are increased. The problem is particularly severe in video applications, and compounded where the media is utilized for storing single video frames on separate tracks of a magnetic disc wherein one track at a time is continuously in contact with the head to provide a continuous stationary display of a single frame. In only five minutes of play time revolving at 3600 RPM, for example, a track on the disc is scraped about 18,000 times by the head. The wear products are so hard and abrasive that they are commonly used as lapping compounds.

To prevent failure causes by contact between the head and disc, lubricated surfaces and/or air film separations have been used. However, any separation between the head and disc caused by such lubricating fluid or air film imposes a loss of signal and, hence, performance. A head/disc separation equal to one wavelength could cause about a 54.6-dB loss in the output of the replay head. Since it is desired to record wavelengths that approach $70\mu''$, the playback head voltage is reduced to 50% by only $7.7\mu''$ of separation. On the otherhand, as discussed above, reduction of separation to meet desired performance would cause the interface to be destroyed within a few seconds.

Prior art solutions to the head-to-disc interface problem have generally been of two types: flying heads in conjunction with rigid hard plated discs, and heads having large surface areas buried in soft flexible "floppy" discs. Flying head discs are very expensive and require complicated and expensive recording/playback systems. The flexible or so-called "floppy" disc reduces the handling and cost problems realized in the flying head rigid-disc system. Some record/read heads for "floppy" discs are relatively large to provide an interface comprised of the large contoured head buried in the soft flexible media. The large record/read head surface area distributed the force per unit area to reduce media wear and separation loss. As the media is moved past the head, however, air collects between the head and disc surface to form an air film. The thickness of this air film is a function of media tension, head surface radius, viscosity of the air, and disc head relative velocity. Because of these restraints, most flexible or "floppy" disc applications are limited to slow speed, low bandwidth digital computer applications or voice recording systems. The performance penality realized precluded the use of such flexible or disc interface for high-speed wide-bandwidth or video-type applications.

It is therefore an object of the present invention to provide an improved technique for storing information on a flexible storage media.

Another object of the invention is to provide an improved system for magnetically storing information on a flexible magnetic recording disc.

A still further object of the invention is to provide a flexible magnetic storage disc cartridge which permits a high-performance, narrow-track video record/read head to be used in contact with the magnetic disc.

It is another object of the invention to provide an apparatus which permits the precise recording and reproducing of wide bandwidth signals such as video signals using inexpensive flexible particulate-type recording media cartridges.

Another object of the invention is to provide a continuously replayable flexible magnetic storage media cartridge in which an air bearing of preselected thickness between the replay head and media is maintainable regardless of head loading.

A further object of the invention is to provide a cartridge containing a recording media with a compliant, but resilient, magnetic recording surface capable of withstanding shock, vibration and head crashes without media degradation.

A still further object of the invention is to provide an improved system for recording and reading information on a flexible information storage media over a wide range of vertical head alignments and special geometries.

Yet another object of the invention is to provide a relatively thin flexible magnetic recording media cartridge system with an improved uniform head-to-media coupling profile.

BRIEF SUMMARY OF THE INVENTION

These and other objects and advantages are accomplished in accordance with an embodiment of the present invention in which a flexible disc is provided for the recording and playback of information on a recording surface thereof. The disc is contained within a cartridge housing which protects the recording surface. At least one opening is provided in the disc which engages with at least one pin member of a drive hub, the drive hub providing rotation to the disc. The outer perimeter of the opening in the disc is larger than the outer perimeter of the pin member so that the disc is free to move laterally along the pin. At least one surface of the cartridge housing acts as a smoothing plane; rotation of the disc causes the disc to rise above such surface creating an air cushion between the disc and surface, with the disc seeking its own level above the surface. An opening is provided in the cartridge housing for receiving a recording and/or playback head; the head is moveable within such opening so that it may be selectively indexed to read and/or write information on a plurality of tracks as the disc rotates within the cartridge. A relatively thin flexible spring member is fixed to the opposite side of the cartridge housing for applying a bias against the rotating disc directly opposite the opening to provide adequate head-to-disc coupling pressure over a wide range of vertical head alignments and geometries. A film of air operates between the spring member and the rotating disc to prevent wear and/or drag. As the head engages the disc, the pressure on the back side of the disc created by the spring member and coupled through the air film provides a restoring force to the disc as the head is raised and lowered, thereby maintaining the disc in close proximity to the head. In one embodiment, the spring member is rectangular in shape with the corners being champered to prevent flutter. In one embodiment, the flexible spring member is comprised of a mylar material. In a further embodiment, one side of the mylar spring member is coated with a conductor such as carbon to prevent electrostatic charge build-up on the magnetic disc and mylar spring member.

BRIEF DESCRIPTION OF THE DRAWINGS

Still further objects and advantages of the invention will become apparent from the detailed description and claims when read in conjunction with the accompanying drawings, wherein:

FIG. 3b is a detailed cross-sectional view of the disc in engagement with the hub member and with the end shaft member in engagement with the hub member;

FIG. 4 is a bottom view of the hub member in engagement with the end member of the drive shaft; and FIG. 5 is a perspective view of the end member of the drive shaft.

DETAILED DESCRIPTION OF PREFERRED EMBODIMENTS

Figure 1:
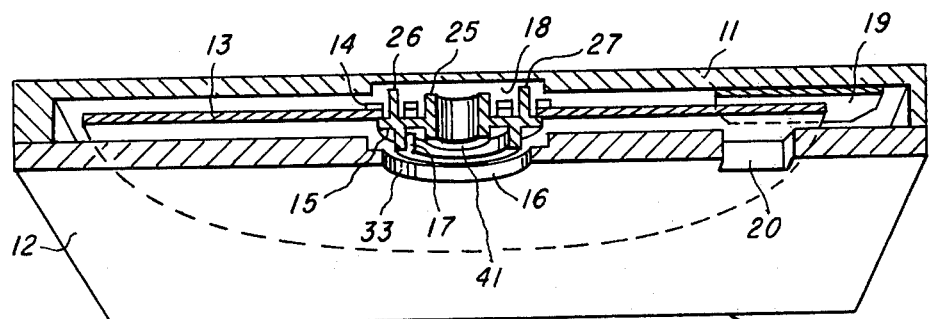
FIG. 1 is a cross-sectional view, in perspective, of a cartridge in accordance with the present invention.

Referring then to the drawings, a cartridge 10 containing a flexible information storage disc 13 is comprised of an upper housing member 11 and a lower housing member 12. In the present embodiment, upper housing member 11 is recessed to provide a cavity 34 in which the disc is contained, although the bottom member could alternately or additionally be recessed, or an additional spacer member provided between the upper and lower members to provide the cavity.

In the present embodiment, two openings 22 and 23 are provided in central portion 14 of disc 13. The openings 22 and 23 are in permanent engagement with pin members 26 and 27 of drive hub member 15. An additional opening 24 is provided for the central member 25 of hub member 15. Hub member 15, which is permanently retained within the cartridge, normally rests in recess 40 of lower housing member 12. Hub member 15 is accessible by means of opening 33 provided in the lower housing member 12. In the present embodiment, a motor 28, illustrated in FIGS. 3a and 3b, having an end member 30, engages with hub member 15 through the opening 33.

Figure 2A:
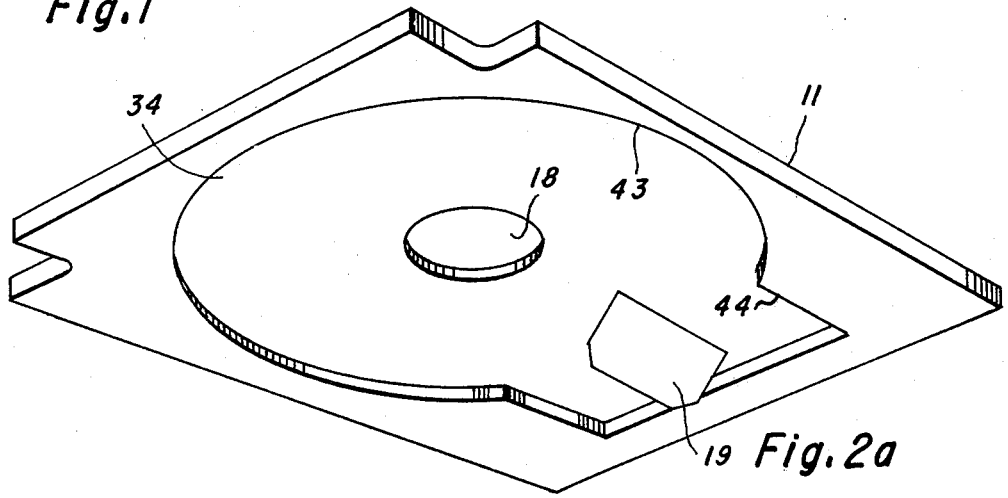
FIG. 2a is a perspective view of the upper member of the cartridge housing.

As illustrated in FIGS. 1 and 2a, upper housing member 11 has a first recessed portion 34 providing clearance for disc 13 and a further recess portion 18 providing clearance for drive member 15. In accordance with the present invention, upper housing member 11 includes a flexible spring member 19 which provides a bias against the upper surface of rotating disc 13 opposite the recording/playback head which is received through opening 20 in the lower housing member 12. The bias provided by spring member 19 provides an improved interface between the recording surface of disc 13 and the recording/playback head as will henceforth be described in detail.

Figure 2B:
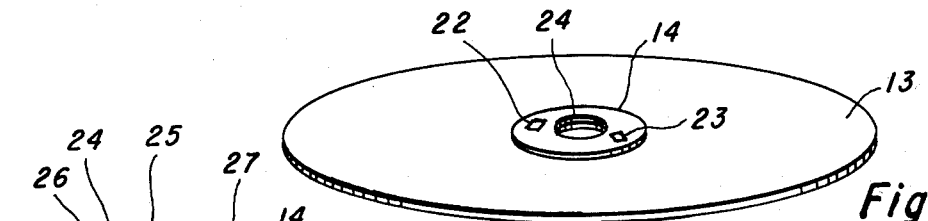
FIG. 2b is a perspective view of the flexible information storage disc.

As illustrated in FIG. 2b, disc 13 includes a reinforced central section 14 having two openings 22 and 23 for receiving drive pins 26 and 27 of hub member 15, and opening 24 for receiving central member 25 of hub member 15. Openings 22 and 23, in the present embodiment, are square and oriented at a 45° angle from each other; the side of one square and the two sides of the second square forming a corner provide three positive abutment edges for the drive pins according to the technique described and claimed in U.S. Pat. No. 4,060,839.

Figure 2C:
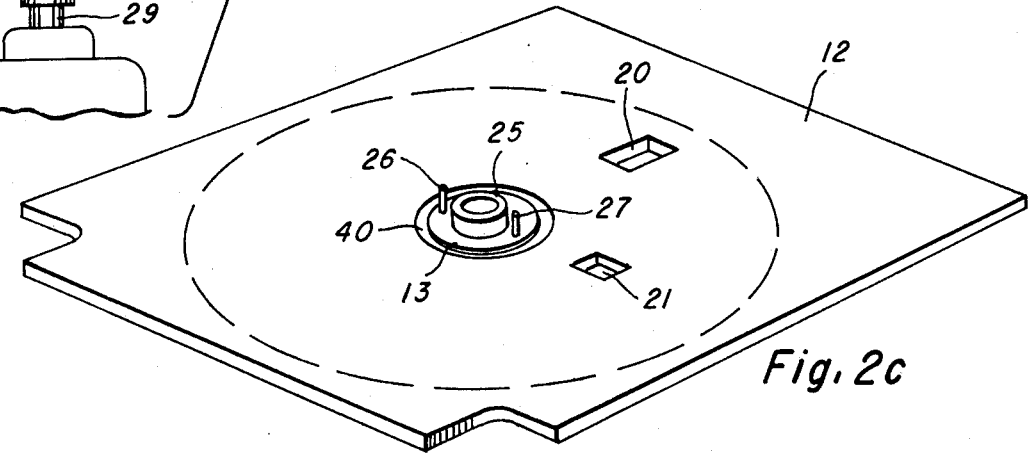
FIG. 2c is a perspective view of the lower member of the cartridge housing.

As illustrated in FIG. 2c, lower housing member 12 includes a recess 40 in which hub member 15 rests. Lower housing member 12 also includes an opening 33 in recessed portion 40 which permits access of end member 30 of the drive shaft to the lower portion of hub member 15. An opening 20 is provided in lower housing member 12 for receiving a record and/or reading head; opening 20 is sufficiently large for the head to be moved to various indexed positions in the openings so that it can be selectively positioned with respect to different tracks on the recording surface of disc 13. A second opening 21 may also be provided for receiving a second recording and/or reading head which may be utilized for reading and/or writing a timing or a synchronization track on disc 13 for video applications.

Openings 22 and 23 in disc 13 are larger than pin members 26 and 27 of hub member 15, and opening 24 is larger than member 25 of hub member 15 so that the disc is free to move laterally along pin members 26 and 27 and member 25. With the upper surface of lower member 12 acting as a smoothing plane, rotation of disc 13 causes the disc to rise above such surface creating an air cushion between the disc and surface.

Figure 3A:
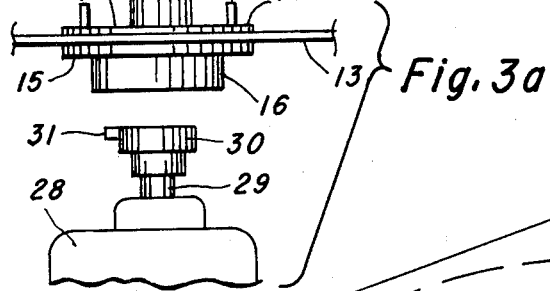
FIG. 3a is a detailed cross-sectional view of the disc in engagement with hub member.

Referring to FIGS. 3a and 3b, the hub 15 and disc 13 are shown, out of and in engagement with, drive shaft 29 of drive motor 28, respectively. End member 30 coupled to drive shaft 29 fits loosely into the opening provided by cylindrical extension 16 of hub member 15.

As motor 28 provides rotation to shaft 29 and, hence, to end member 30, latch member 31, in the form of a radial projection on the outer perimeter of end member 30, engages with latch member 17, in the form of a radial projection on the inner perimeter of cylindrical extension 16, as illustrated in FIGS. 3b and 4. Note that while in rotation, the outer perimeter of the cylindrical extension 41 of hub member 15 contacts the inner perimeter 42 of end member 30 along a line directly opposite the engaged latch members 17 and 31. Thus, hub member 15 and end member 30 always engage in the same identical position providing greater accuracy in positioning the recording tracks of the disc in the cartridge with respect to the recording and/or playback head of different recording and/or playback apparatus. The end member 30 is shown in detail in the perspective view of FIG. 5.

Referring back to FIG. 1, upper member 11 and lower member 12 fit together to provide a relatively thin envelope for disc 13. In one embodiment, cartridge 10 is, for example, 0.25" in thickness. Spring member 19, in one embodiment, is comprised of a flexible mylar material between, for example, 0.02" and 0.00075" thick, and preferably about 0.0015" thick. The size of spring member 19 is dependent upon the size of the opening 20 which is likewise dependent upon the amount of surface area over which the record and/or read head is to be indexed. In the present embodiment, for example, the opening 20 may be 0.25" wide by 0.5" long with the spring member 19 being 1.0" wide, and being positioned over the back side of the rotating magnetic disc at an angle of 45°. In such embodiment, spring member 19 is, for example, 1.0" L long and located so that approximately 0.2" of the edge of spring member 19 extends over disc 13. A film of air operates between spring member 19 and disc 13 when the disc is in rotation to prevent wear and/or drag. As the recording and/or read head engages the rotating disc, the back pressure created by the air film operating between spring member 19 and rotating disc 13 provides a restoring force to the disc as the head is raised or lowered within a range of 0.010" or more, for example. The corners of mylar spring member 19, as illustrated in FIG. 2a, are champered to prevent flutter. In one embodiment, one side (the upper side, for example) of mylar spring member 19 is coated with a conductive material, such as carbon, to prevent electrostatic charge build-up on the magnetic disc and spring member.

Preferred embodiments of a cartridge with a flexible magnetic recording disc, according to the present invention, has now been described in detail. Since it is obvious that many additional changes and modifications can be made in the above-described details without departing from the nature and spirit of the invention, it is understood that the invention is not to be limited to said details except as set forth in the appended claims.

What is claimed is:

1. A system for recording and/or reading information on a recording surface of a sheet of flexible information storage media, said system comprising:
   (a) a sheet of flexible information storage media having first and second opposite major surfaces, said first major surface for recording information thereon;
   (b) a cartridge containing said information storage media, said cartridge having:
      (i) a first relatively flat surface with an opening for receiving a recording and/or playback head therethrough, said flat surface being in facing relationship to the first major surface of said information storage media, and
      (ii) a second relatively flat surface opposite said first relatively flat surface, said second relatively flat surface being in facing relationship to said second major surface;
   (c) means for rotating said information storage media so that the rotational motion of said information storage media causes said information storage media to rise above said first relatively flat surface, creating an air cushion between said first major surface and said first relatively flat surface, said recording and/or playback head writing and reading information on said first major surface while said media is in rotation; and
   (d) a flexible spring member affixed to said second relatively flat surface opposite the recording and/or playback head receiving opening in said first relatively flat surface for providing a bias by air back pressure against the second major surface of said information storage media when said media is in rotation, said flexible spring member being sufficiently light in weight to allow an air film to form between the spring member and the information storage media when said media is in rotation, thereby preventing wear and drag.

2. A cartridge comprising:
   (a) a sheet of flexible information storage media having first and second opposite major surfaces and being of substantially circular shape, with said first major surface for storing information thereon;
   (b) a drive member coupled to said information storage media for providing rotational motion to said information storage media when said drive member is in rotation; and
   (c) a cartridge housing in form of a rigid envelope having a chamber with first and second major interior end surfaces, said information storage media and said drive member being contained within said chamber, said cartridge housing having:
      (i) a first opening extending through one of said end surfaces providing access for a rotational means to engage said drive member, said drive member being retained within said cartridge housing,
      (ii) a second opening extending through said first end surface for receiving a recording and/or playback head with said head for respectively writing and/or reading information on said first major surface of said media as it is rotated within said cartridge housing, and
      (iii) a flexible spring member affixed to said second end surface opposite said second opening, said flexible spring member for providing a bias by air back pressure against the second major surface of said information storage media in opposing relationship to the recording and/or playback head, said flexible spring member being sufficiently light in weight to allow an air film to form between the spring member and the information storage media when said media is in rotation, thereby preventing wear and drag.

3. A system for recording and/or reading information on a recording surface of a sheet of flexible information storage media, said system comprising:
   (a) a sheet of flexible information storage media having first and second opposite major surfaces, said first major surface for recording information thereon;

(b) a cartridge containing said information storage media, said cartridge having:
  (i) a first relatively flat surface with an opening for receiving a recording and/or playback head therethrough, said flat surface being in facing relationship to the first major surface of said information storage media, and
  (ii) a second relatively flat surface opposite said first relatively flat surface, said second relatively flat surface being in facing relationship to said second major surface;

(c) means for rotating said information storage media so that the rotational motion of said information storage media causes said information storage media to rise above said first relatively flat surface, creating an air cushion between said first major surface and said first relatively flat surface, said recording and/or playback head writing and reading information on said first major surface while said media is in rotation; and (d) means affixed to said second relatively flat surface and extending therefrom towards the second major surface of said information storage media for providing aerodynamic pressure without contacting said information storage media against the second major surface when said media is in rotation, said aerodynamic pressure being exerted in opposing relationship to pressure exerted by the recording and/or playback head against the first major surface of said information storage media, thereby biasing the information storage media toward the recording and/or playback head.

4. The system according to claim 3 wherein said means for providing said aerodynamic pressure is a flexible spring member, said spring member being essentially rectangular in shape and having an information storage media-engaging side which is champered to prevent flutter.

5. The system according to claim 3 wherein said means for providing aerodynamic pressure includes a coating or conductive material on a major surface thereof for preventing electrostatic charge buildup on said means and said information storage media.

6. The system according to claim 3 wherein said information storage media is a sheet of magnetic recording media having a magnetic flux-responsive coating on a recording surface thereof.

7. The system according to claim 3 wherein said information storage media is in the shape of a disc.

8. A cartridge comprising:
(a) a sheet of flexible information storage media having a first and second opposite major surface, and being of substantially circular shape, with said first major surface for storing information thereon;

(b) a drive member coupled to said information storage media for providing rotational motion to said information storage media when said drive member is in rotation; and (c) a cartridge housing in form of a rigid envelope having a chamber with first and second relatively flat end surfaces oppositely positioned, said information storage media and said drive member being contained within said chamber, said cartridge housing having:
  (i) a first opening extending through one of said relatively flat surfaces providing access for a rotational means to engage said drive member, said drive member being retained within said cartridge housing,
  (ii) a second opening extending through said first relatively flat surface for receiving a recording and/or playback head with said head for respectively writing or reading information on said first major surface of said media as it is rotated within said cartridge housing, and
  (iii) means affixed to said second relatively flat surface and extending therefrom towards the second major surface of said information storage media for providing aerodynamic pressure without contacting said information storage media against the second major surface when said media is in rotation, said aerodynamic pressure being exerted in opposing relationship to pressure exerted by the recording and/or playback head against the first major surface of said information storage media, thereby biasing the information storage media toward the recording and/or playback head.

9. The system according to claim 8 wherein said means for providing said aerodynamic pressure is a flexible spring member, said spring member being essentially rectangular in shape and having an information storage media-engaging side which is champered to prevent flutter.

10. The system according to claim 8 wherein said means for providing areodynamic pressure includes a coating of conductive material on a major surface thereof for preventing electrostatic charge buildup on said means and said information storage media.

11. The system according to claim 8 wherein said information storage media is a sheet of magnetic recording media having a magnetic flux-responsive coating on a recording surface thereof.

12. The system according to claim 8 wherein said information storage media is in the shape of a disc.

* * * * *